(12) United States Patent
Patel

(10) Patent No.: US 12,162,687 B1
(45) Date of Patent: Dec. 10, 2024

(54) CONTAINER TRANSPORTERS WITH DUAL CONTAINER SLOTS

(71) Applicant: Amazon Technologies, Inc., Seattle, WA (US)

(72) Inventor: Kushal Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 786 days.

(21) Appl. No.: 17/315,664

(22) Filed: May 10, 2021

(51) Int. Cl.
| | |
|---|---|
| *B65G 1/137* | (2006.01) |
| *B25J 9/00* | (2006.01) |
| *B25J 9/10* | (2006.01) |
| *B25J 15/06* | (2006.01) |
| *B65G 1/04* | (2006.01) |

(52) U.S. Cl.
CPC .......... *B65G 1/1376* (2013.01); *B25J 9/0009* (2013.01); *B25J 9/1035* (2013.01); *B25J 15/0616* (2013.01); *B25J 15/0683* (2013.01); *B65G 1/0435* (2013.01)

(58) Field of Classification Search
CPC ... B25J 15/0616; B65G 1/0435; B65G 47/918
USPC ........................................ 414/280, 627, 661
See application file for complete search history.

(56) References Cited

U.S. PATENT DOCUMENTS

| | | | | |
|---|---|---|---|---|
| 4,678,390 A | * | 7/1987 | Bonneton | B65G 1/1375 414/416.03 |
| 5,380,139 A | * | 1/1995 | Pohjonen | B65G 1/0435 414/280 |
| 9,725,257 B2 | * | 8/2017 | Schenning | B65G 67/08 |
| 2003/0185656 A1 | * | 10/2003 | Hansl | B65G 1/0435 414/277 |
| 2006/0017298 A1 | * | 1/2006 | Osten | B25J 15/0616 294/65 |
| 2008/0078653 A1 | * | 4/2008 | Goater | B65G 59/067 198/617 |
| 2008/0281717 A1 | | 11/2008 | Kortelainen | |
| 2016/0288322 A1 | * | 10/2016 | Lin | B25J 9/163 |
| 2017/0137221 A1 | | 5/2017 | Koide | |

OTHER PUBLICATIONS

U.S. Appl. No. 16/751,084, filed Jan. 23, 2020, titled Container Transporter.

* cited by examiner

*Primary Examiner* — Timothy R Waggoner
(74) *Attorney, Agent, or Firm* — Eversheds Sutherland (US) LLP

(57) ABSTRACT

Systems, methods, and computer-readable media are disclosed for container transporters and related item manipulation devices. In one embodiment, an example item manipulation device may include a support platform, and a conveyance surface coupled to the support platform, where containers can be moved over the conveyance surface from a first end of the support platform to a second end of the support platform. Some embodiments may include a first actuator extending along a length of the conveyance surface, a sliding component configured to be actuated from a first end of the first actuator to a second end of the first actuator, and a rotary actuator coupled to the sliding component. Example embodiments may include a member coupled to the rotary actuator, the member configured to be actuated from a first position to a second position via the rotary actuator, and a suction cup assembly coupled to the member.

17 Claims, 12 Drawing Sheets

CONTAINER TRANSPORTERS WITH DUAL CONTAINER SLOTS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
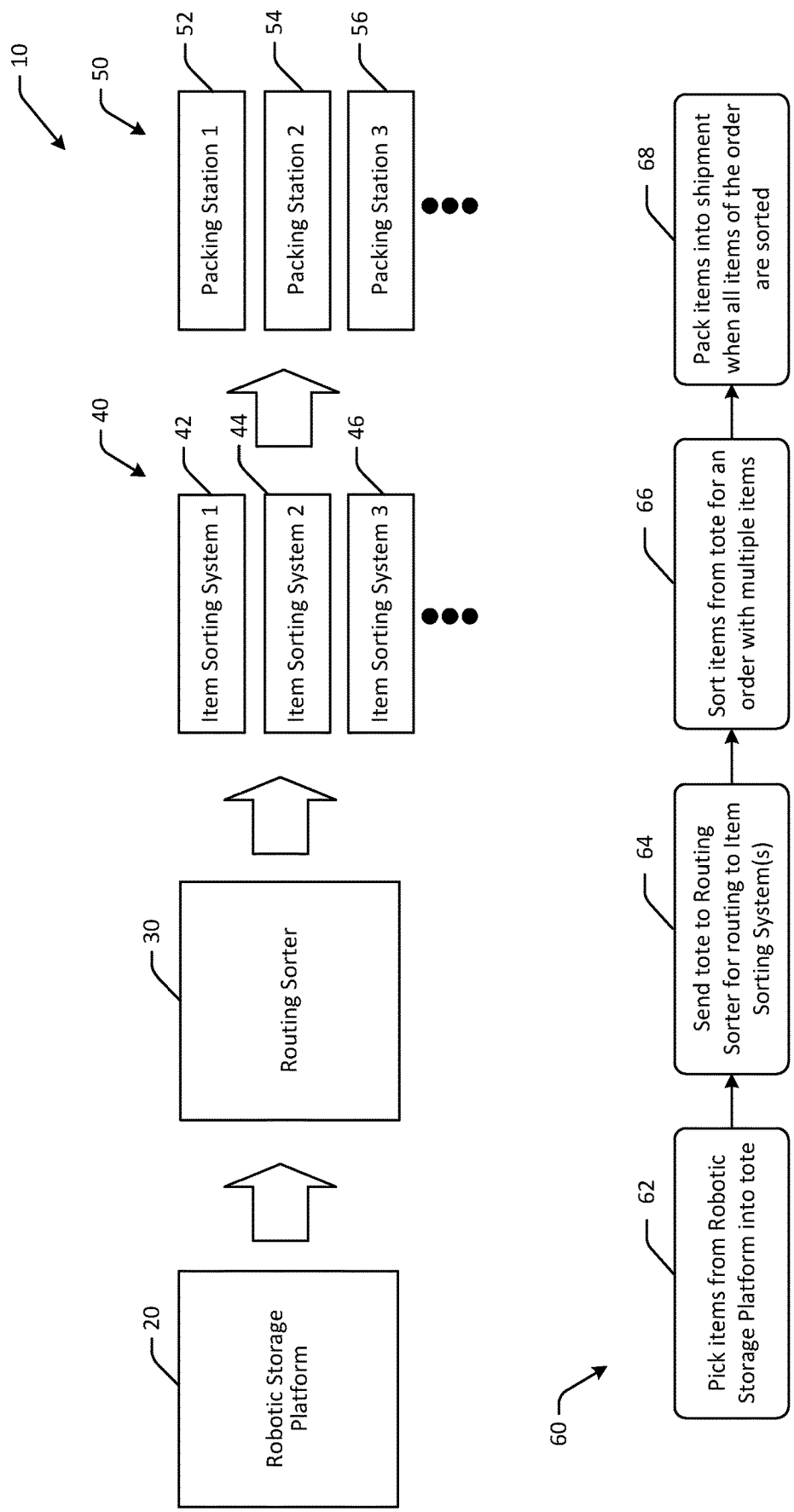
FIG. 1 is a hybrid schematic illustration of an example use case for container transporters with dual container slots and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Incorporation by Reference

This case incorporates by reference U.S. Ser. No. 16/751,084, filed Jan. 23, 2020 and titled "Container Transporter," which describes a number of different use cases and applications for container transporters. The embodiments described herein may be used, in addition to other uses, instead of the container transporters described in the '084 application to perform the various functions and/or in the various applications set forth in the '084 application. The '084 application is therefore hereby incorporated by reference.

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. Similarly, moving containers that include one or more items inside may be difficult as well. For example, retrieving a container, securing the container, and transporting the container may be easy for a human, but may be difficult for robotic handling due to the potential for items to move within the container during transport, changes in center of gravity, and so forth. Furthermore, increasing throughput by moving more than one container with item(s) inside may be increase a level of difficultly due to center of gravity issues, overall weight of assembly constraints, maintaining control over all of the containers, and so forth.

Embodiments of the disclosure include methods and systems for automated handling of containers and objects (regardless of container contents) that may improve processing and fulfillment of orders, or other object aggregation tasks. Certain embodiments include end of arm tools, or end effectors, that can be used to transport multiple containers at the same time. The end of arm tools can be coupled to robotic manipulators, such as robotic arms, that are configured to move the end of arm tools into position to grasp and securely handle and transport containers, so as to increase throughput and speed of container movement. Some embodiments may include a single major actuator for reduced complexity, decreased maintenance requirements, and improved reliability. Some embodiments may be configured to pick and place containers from one container pod to another, which may require precise movement to direct containers into container slots in a container pod. Some embodiments include optimized process flows for processing of orders at fulfillment centers, as well as process flows or methods to increase speed of transporting containers as a result of improved speed in handling containers. As a result, throughput of fulfillment centers may be improved, and/or logistics of fulfillment center operations may be less complicated.

Referring to FIG. 1, an example use case 10 for container transporters with dual container slots and an example process flow in accordance with one or more embodiments of the disclosure. Although discussed in the context of online orders, other embodiments may be directed to any suitable use case where products or containers are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1 may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

Embodiments of the disclosure include container transporters with dual container slots that are configured to handle two containers at the same time. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other container transporters, the container transporters described herein may securely grasp and handle multiple containers at the same time, and may provide control over containers during transport, with repeatable performance. Certain embodiments may be configured to automatically load and unload containers in a safe and efficient manner.

Embodiments of the disclosure may therefore provide an end of arm tool for use with robotic manipulators or other equipment to pick and place containers in pods or any other tote storage facility. End of arm tools may be configured to exchange totes between pods and/or between a pod and a conveyor. Certain embodiments eliminate use of a suction cup and hence also eliminate the necessity of air lines (e.g., if rotary grippers are powered by electric actuators) and also eliminates the issue of suction cup maintenance and periodic replacement.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
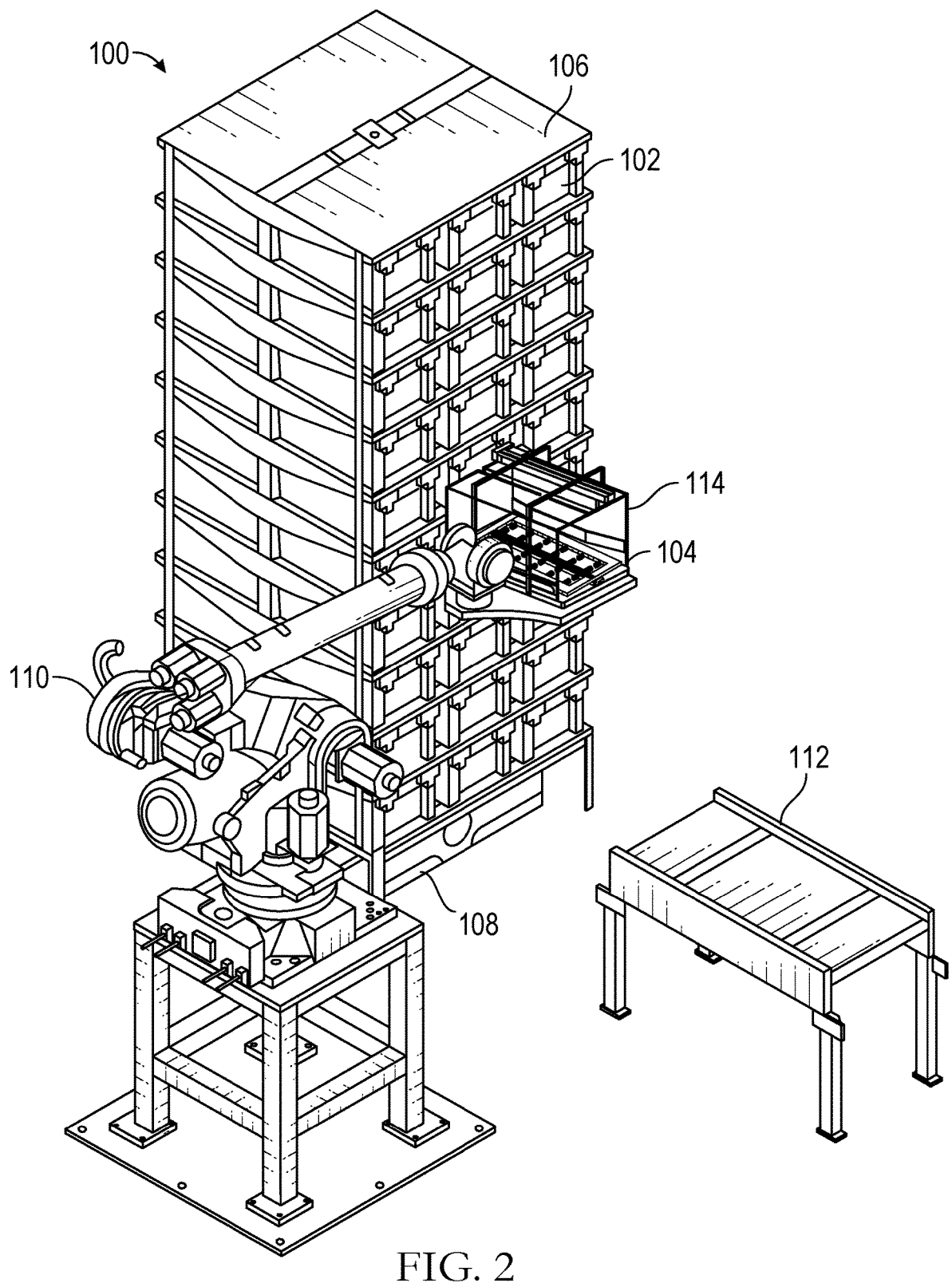
FIG. 2 is a schematic illustration of an example container management system for moving and managing containers in accordance with one or more embodiments of the disclosure.

FIG. 2 is a schematic illustration of an example container management system for moving and managing containers in accordance with one or more embodiments of the disclosure. Other embodiments may include additional or fewer components. The illustration of FIG. 2 may not be to scale, and may not be illustrated to scale with respect to other figures. The robotic manipulator and end of arm tool configured to grasp multiple items illustrated in FIG. 2 may be used throughout the fulfillment center environment discussed with respect to FIG. 1.

In the example of FIG. 2, a container transport can include a support platform that may be connected to a robotic manipulator (e.g., a robot arm). The robotic manipulator can position the container transport for engaging with a container and loading that container onto the container transport. An end of arm tool, which may be an item manipulation device, may be mounted to the container transport. The item manipulation device may be configured to load and transport two containers at the same time, regardless of the contents of the individual containers. The item manipulation device can engage with the containers and move in order to position the container on the container transport, for example, on a container conveyor such as a belt or set of rollers (e.g., the cantilevered rollers in the example of FIG. 2 may be a container conveyor, etc.). The container transport may move the container via the container conveyor to a position where the container is completely or almost completely on the container conveyor. The container conveyor can hold the container in place while the robotic manipulator moves the container transport to a position for unloading the container. The container conveyor may unload the container onto an unloading station via the container conveyor and/or the container manipulator.

In FIG. 2, a container management system 100 for moving and managing containers 102 using a container transport 104 is depicted, according to at least one example. As described herein, containers 102 can be positioned in a container holder 106. The container holder 106 can be moved around a warehouse environment via a mobile drive unit 108, for example. The mobile drive unit 108 can move the container holder 106 to a position for removal of the containers 102, for example, by the container transport 104 attached to a robotic manipulator 110. The container transport 104 can include various components for engaging with and moving the containers 102. The robotic manipulator 110 can position the container transport 104 for loading of a container 102 onto the container transport and move the container and the container transport to a position for unloading the container. The container 102 may pass at least partially through a container passage 114. For example, the container 102 can be received by a first side (e.g., the front) of the container passage 114, pass through the container passage, and exit through a second side (e.g., the rear) of the container passage. However, in some instances, a portion of the container 102 may be partially or fully received by the first side. At least a portion of the container received by the first side may exit back through the first side, e.g., such that the container is partially received by the container passage or travels within the container passage without passing through the entirety of the container passage or without passing through an opposite side. The container passage 114 can include one or more of a front, a rear, a top, one or more sides, and a bottom. The container passage 114 may be at least partially defined by a shell and/or a similar casing. The container 102 may be unloaded onto an output station 112 or a device for movement or other processing of the container.

The containers 102 can be or include a container or a bin with an interior area for containing one or more items. The containers 102 may include rigid or semi-rigid material, for example, plastic, cardboard, paper, or any suitable material for containing items. In some embodiments, the containers 102 can include handles, hooks, engagement surfaces, or other features and/or components for engaging with the container transport 104. In further embodiments, the containers 102 may be items, e.g., such that the items are moved by the container transport 104 without first being positioned in a container 102.

Multiple containers 102 can be positioned in the container holder 106. The container holder 106 can include one or more faces for receiving containers 102. The faces can include shelves, walls, compartments, and/or rails for receiving the containers 102. For example, the faces can be positioned in the container holder 106 to arrange containers 102 into vertical columns and/or horizontal rows.

The container holder 106 can be moved by a mobile drive unit 108 around the warehouse environment in some embodiments, although the container holder 106 may additionally or alternatively include or be accompanied by a propulsion system or other system to move the container holder 106. The mobile drive unit 108 can include a propulsion system and engagement components for engaging with the container holder 106. The engagement components can engage with the container holder 106 for movement of the container holder, for example, by lifting the container holder. The mobile drive unit 108 can be manually controlled to move the container holder 106 or can include components for automated movement. For example, the mobile drive unit 108 can include components to automatically move toward and engage with a container holder 106 and move the container holder into a suitable position for interaction with the robotic manipulator 110.

The mobile drive unit 108 can position the container holder 106 near the robotic manipulator 110 for moving, removing, and/or depositing containers 102 relative to the container holder. The robotic manipulator 110 can be or include a robotic arm moveable along multiple axes. For example, the robotic arm can be moveable along six-axes, although any other suitable number greater than or less than six could alternatively be utilized. The robotic manipulator 110 can include one or more attachment points and/or engagement components for attaching to various components. For example, the robotic manipulator 110 can attach to the container transport 104.

In some embodiments, the robotic manipulator 110 can be positioned at a stationary point in a warehouse environment. However, the robotic manipulator 110 may be moveable around the warehouse environment, either under its own power and/or under the power of another device.

The robotic manipulator 110 can move the container transport 104 between a position at or near the container holder 106 and a position at or near the output station 112 or other feature for receiving the container 102. The output station 112 can receive the container 102 for further processing. For example, items can be added and/or removed from the container 102. The output station 112 can be or include a conveyor, motor driven rollers, a processing station for the containers 102, a station for adding and/or removing items, a station for manual handling of the containers, and/or any suitable component or components for handling one or more containers. The output station 112 can receive the containers 102 from the container transport 104 and move the containers to a position in a warehouse environment. For example, the output station 112 can move the containers 102 for further processing. The output station 112 can be or include motor driven rollers, belts, and/or other components suitable for moving containers 102.

Figure 3:
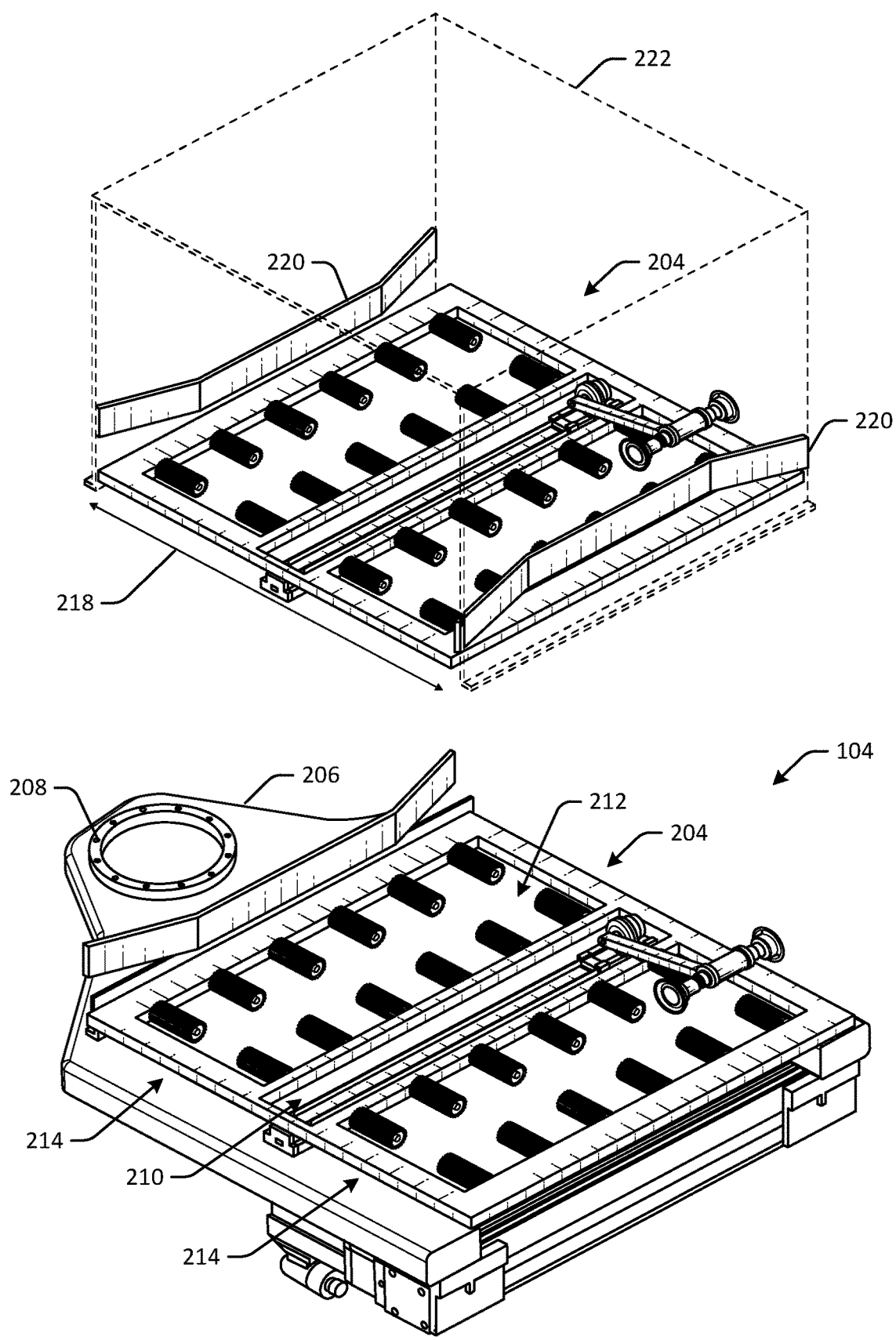
FIG. 3 schematic illustrates an example container transporter with dual container slots in various views in accordance with one or more embodiments of the disclosure.

FIG. 3 is a schematic illustration of an example container transporter with dual container slots in various views in accordance with one or more embodiments of the disclosure. Other embodiments may include additional or fewer components. The illustration of FIG. 3 is not to scale, and may not be illustrated to scale with respect to other figures. The container transporter illustrated in FIG. 3 may be the same container transporters discussed with respect to FIGS. 1-2.

In FIG. 3, a perspective view of a portion of an example container transport 104 that can be included in particular embodiments of the container management system 100 of FIG. 1 is shown. The transporter may include the container conveyance assembly 204 that can be included in particular embodiments of the container transport 104 of FIG. 3. The container conveyance assembly 204 can include one or more rollers 212 that may be passively driven or may be actively driven, and may form one or more conveyance surfaces 214. The rollers 212 may be cantilevered rollers to reduce weight, or can extend across the respective halves of the base. The rollers 212 can have a length that occupies at least a part of the width distance 218. The width distance 218 can correspond to the combined width of the one or more conveyance surfaces 214 and the opening 210. The width distance 218 can correspond to the width of two containers 102 or may be a larger or smaller width than the width of the containers. The rollers 212 can be mounted to the support platform 206 and rotate in one or more directions. Some or all of the rollers 212 can be driven by one or more motors. The rollers 212 can be spaced apart from one another by a length distance. The length distance can be equal to or greater than the length of containers 102. For example, individual containers 102 can be positioned on the conveyance surfaces 214 between the respective pairs of rollers 212.

The one or more conveyance surfaces 214 can be positioned on the rollers 212 and have an upper surface for receiving and conveying the containers 102. The conveyance surfaces 214 can be positioned a length distance 216 apart, optionally forming a gap or opening 210. The conveyance surfaces 214 can be or include a belt, a chain, a roller chain, a plastic chain, a loop of material, for example, rubber or nylon, or any suitable device for supporting and transporting the containers 102. In some embodiments, the container conveyance assembly 204 can include beltless motor-driven rollers for conveying the containers 102. The beltless motor-driven rollers can be driven by one or more motors for moving the containers 102 through the container passage 114. In some embodiments, the conveyance surfaces 214 may be any active surface, such as a surface that includes one or more active drive components. For example, the conveyance surfaces 214 may include one or more driven rollers, one or more driven belts, one or more motor driven surfaces, or another driven surface.

In many embodiments, the container conveyance assembly 204 can include one or more side rails 220 positioned on the sides of the conveyance surfaces 214. The side rails 220 can be sized and shaped to guide the centerline of the containers 102 toward the centerline of a portion of the container conveyance assembly 204 configured to receive a container. For example, the side rails 220 can be positioned further apart at a receiving section of the container conveyance assembly 204 and narrow toward the center of the container conveyance assembly. The side rails 220 can be or include metal or similar material that can withstand the force of a container 102 that is in motion. In some embodiments, the side rails 220 can be used to hold the containers 102 at a center of the container conveyance assembly 204. The side rails 220 may be or include resilient material that can flex to accommodate different sizes of containers 102. In further embodiments, the side rails 220 can be adjustable to accommodate different sizes of containers 102 and/or hold the containers in place on the container conveyance assembly 204.

Figure 5:
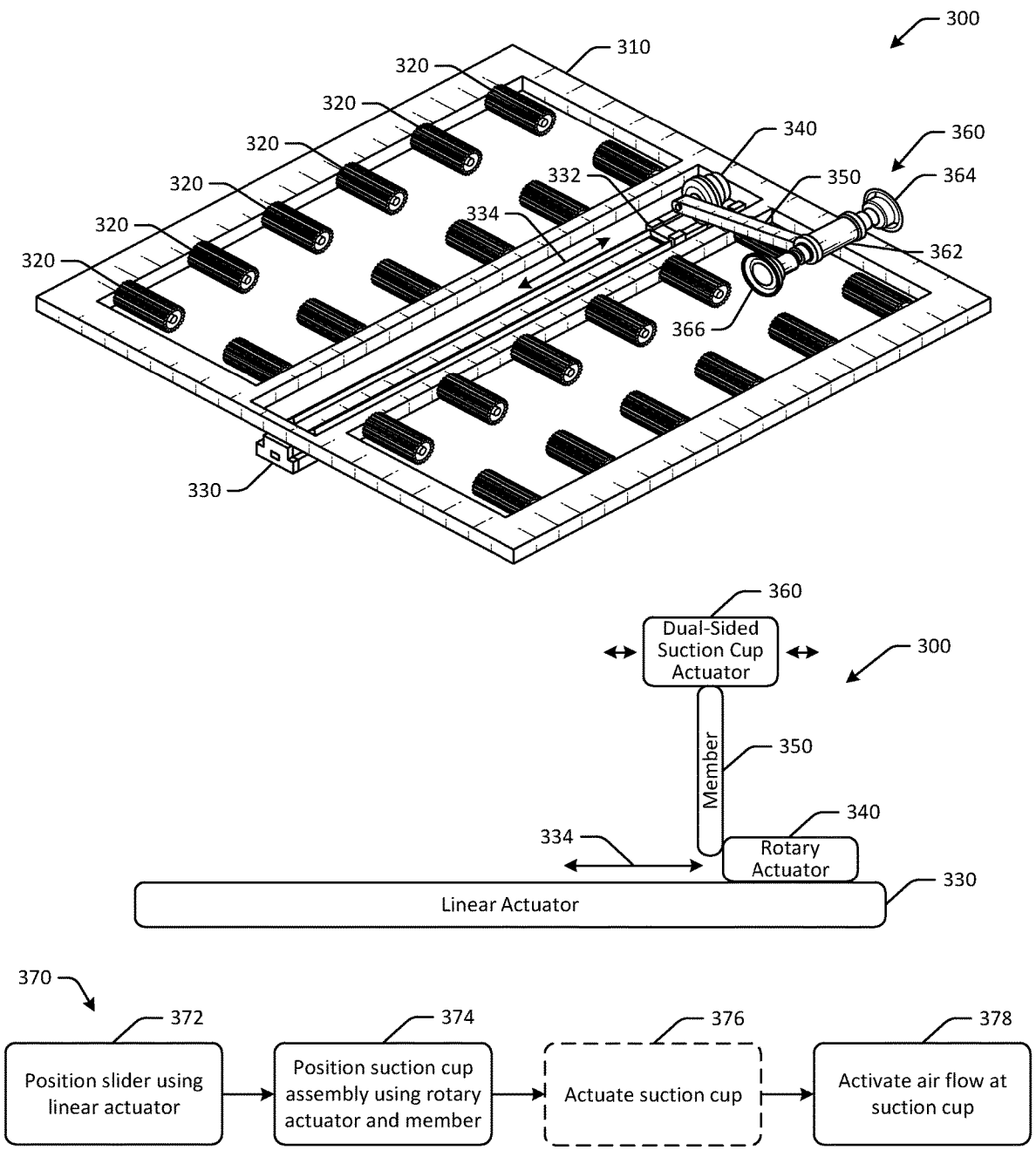
FIG. 5 is a schematic illustration of an item manipulation device in perspective view and cross-sectional schematic view accordance with one or more embodiments of the disclosure.

The container transport 104 can include a container manipulation assembly 202 and a container conveyance assembly 204. The container manipulation assembly 202 may be an item manipulation device and may include one or more actuators, as illustrated in FIG. 5 in one example. The container manipulation assembly 202 can engage with a container 102 and position the container on or otherwise in engagement with the container conveyance assembly 204 for conveyance along the container transport 104. The container manipulation assembly 202 and the container conveyance assembly 204 can be mounted to a support platform 206. The support platform 206 can include one or more gaps or openings 210 in instances where more than one set of rollers is included. Other embodiments may include two discrete conveyor belts. The container manipulation assembly 202 may be mounted above and/or to the side of the container conveyance assembly 204.

The support platform 206 can be made of or include material strong enough to support one or more containers 102 positioned on the container transport 104. The support platform 206 can include mounting surfaces for mounting one or more components. For example, the support platform 206 can be a platform with a top mounting surface and a bottom mounting surface for mounting of various components. In some embodiments, the mounting surfaces may include mounting points and/or mounting hardware for the mounting of the various components.

In many embodiments, the support platform 206 includes an attachment point 208 for attaching of the container transport 104 to the robotic manipulator 110. The attachment point 208 can connect with one end of the robotic manipulator 110, such that, the robotic manipulator is able to move the container transport 104. The connection between the robotic manipulator 110 and the attachment point 208 can be strong enough to support the combined weight of the container transport 104 and one or more containers 102. The attachment point 208 can include connection points for coupling power, signal lines, hydraulic lines, pneumatic lines, and/or other suitable connections for elements that may facilitate proper functioning of components incorporated in the container transport 104. The connection points can be used, for example, to connect the container transport 104 to a common power source shared by the robotic manipulator 110. The attachment point 208 can be manually connected to the robotic manipulator 110 or can automatically connect with the robotic manipulator. For example, the attachment point 208 can be or include a quick connect attachment for automatic connection with the robotic manipulator 110.

The container conveyance assembly 204 can define a portion of a container passage 114 for movement of the containers 102. For example, the container conveyance assembly 204 can define the bottom portion of the container passage 114. The containers 102 can be moved along or through the container passage 114 by the container conveyance assembly 204 and/or the container manipulation assembly 202. The container manipulation assembly 202 can move relative to the container passage 114, such by movement back and forth and/or inside and the outside of the container passage 114, being removed from the inside and/or the outside of the container passage, or being relocated between the inside and/or the outside of the container passage. The container manipulation assembly 202 can engage with and/or move the containers 102 when the container manipulation assembly is positioned inside or outside the container passage 114.

As an illustrative example, the container manipulation assembly 202 can include a linear actuator disposed along a middle portion, such as a center, of the support platform 206. The linear actuator may be configured to actuate a sliding component from a first end of the support platform 206 to a second end at an opposite side, and from the second end of the support platform 206 to the first end. A rotary actuator may be coupled to the sliding component and may slide along the linear actuator. A suction cup assembly may be coupled to the rotary actuator via a member, such that actuation of the rotary actuator causes the suction cup assembly to rotate from a first position at a first side of the container manipulation assembly 202 to a second position at a second side of the container manipulation assembly 202. In this manner, the suction cup assembly may be configured to engage with containers disposed on both sides of the container manipulation assembly 202. In some embodiments, the suction cup assembly may include an actuator, such as a pneumatic actuator, that may actuate suction cups of the suction cup assembly outwards, so as to provide improved grasp on containers during a grasping or engagement process. The container manipulation assembly 202 may therefore be configured to push and/or pull containers onto and/or off of the conveyance surface using the suction cup assembly, where the suction cup assembly can be positioned via movement of the linear actuator and rotary actuator.

The container manipulation assembly 202 can move laterally to a position to engage with the container 102 (e.g., a position where at least a portion of the container manipulation assembly 202 is outside of the container passage 114). The container manipulation assembly 202 can engage with the container 102 and pull the container 102 at least partially onto the container conveyance assembly 204 (e.g., by moving laterally until the container manipulation assembly 202 is positioned inside the container passage 114). The container 102 can be conveyed through the container passage 114, e.g., from one end of the container transport 104 to another end of the container transport.

Figure 4:
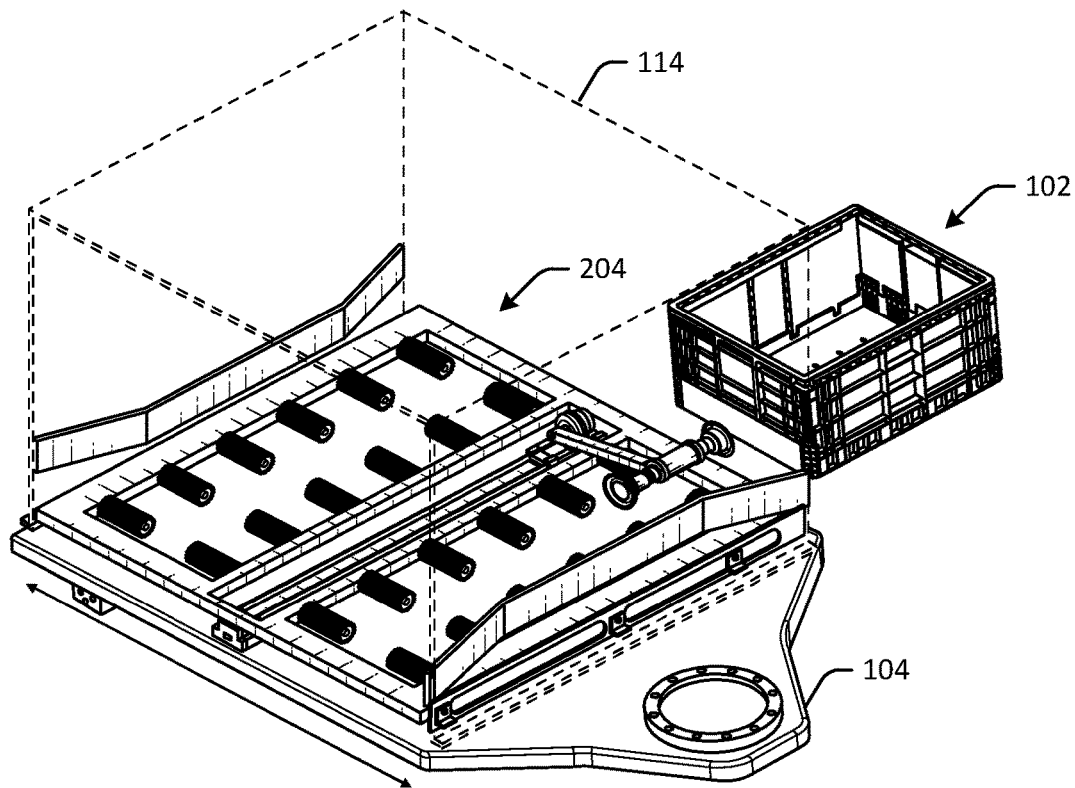
FIG. 4 is a schematic illustration of various states of components that may be implemented in a simplified example process for receiving, moving, and depositing containers in accordance with one or more embodiments of the disclosure.
Figure 4:
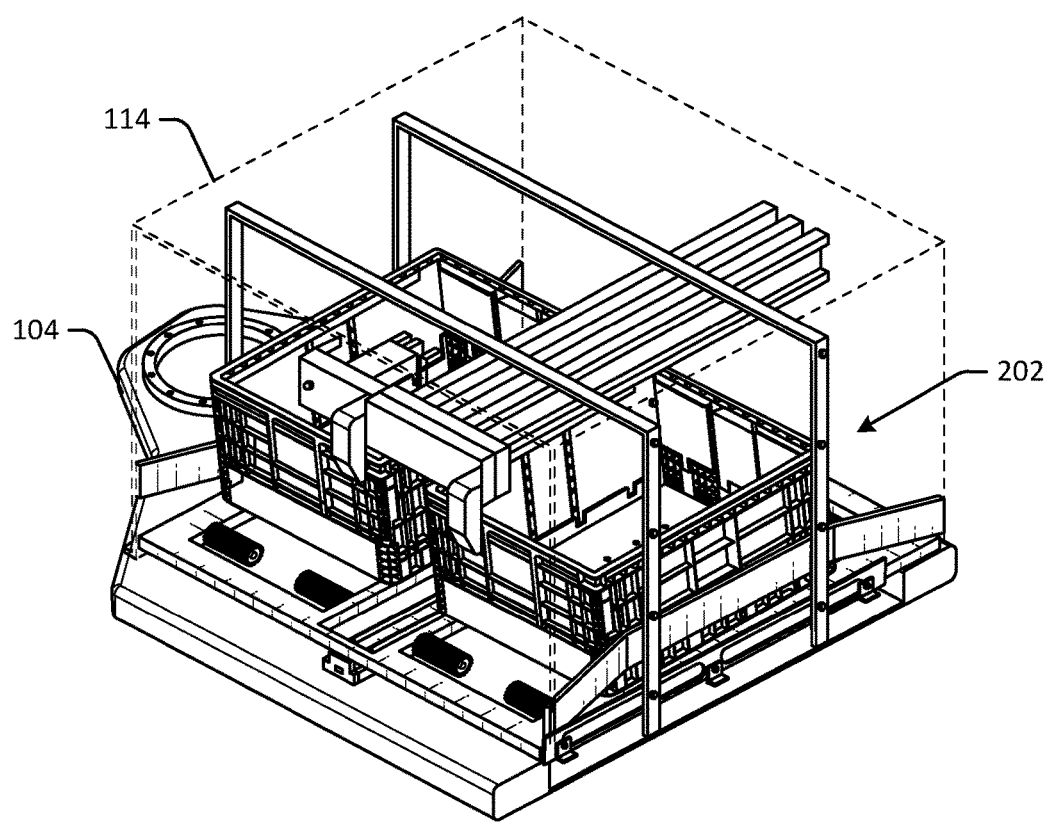

FIG. 4 is a schematic illustration of various states of components that may be implemented in a simplified example process for receiving, moving, and depositing a container in accordance with one or more embodiments of the disclosure. Other embodiments may include additional or fewer components. The illustrations of FIG. 4 is not to scale, and may not be illustrated to scale with respect to other figures. The container transporter illustrated in FIG. 4 may be the container transporter discussed with respect to FIGS. 1-3.

In FIG. 4, the container transport 104 is depicted positioned next to a container 102. The container 102 can be positioned in the container holder 106 or may be positioned on another surface and/or held. The container transport 104 can be positioned next to the container 102 to substantially align the container with container passage 114 that corresponds to one of the container slots of the container transport 104. The container transport 104 can be positioned next to and aligned with the container 102 by the robotic manipulator 110, the mobile drive unit 108, and/or any device suitable for moving the container transport. The container manipulation assembly 202 may be moved to an engagement position for engagement with the container 102. For example, a suction cup assembly of the container manipulation assembly 202 may be positioned adjacent to the container 102 via manipulation of the linear actuator and/or rotary actuator. Once in position, suction may be activated to engage a surface of the container 102, after which the container 102 may be pulled towards the container transport 104. The suction cup may be used to pull the container 102 onto the conveyance assembly 204 to load the container 102 onto the container transporter. To unload containers, a suction cup on an opposite side of the suction cup assembly may be used, along with optional positive air pressure. Any number of suction cups may be included.

FIG. 5 is a schematic illustration of an item manipulation device 300 in perspective view and cross-sectional schematic view accordance with one or more embodiments of the disclosure. Other embodiments may include additional or fewer components. The illustrations of FIG. 5 are not to scale, and may not be illustrated to scale with respect to other figures. The item manipulation device illustrated in FIG. 5 may be the container manipulation assembly and/or may be used with the container transporters discussed with respect to FIGS. 1-4.

In FIG. 5, a portion of the item manipulation device 300 is depicted in perspective view. The item manipulation device 300 may include a support platform 310. The support platform 310 may be configured to support two containers in a side-by-side arrangement, so as to allow for two containers to be transported at the same time. The item manipulation device 300 may be part of an end of arm tool that is coupled to a robotic manipulator or other component of a container transport. The item manipulation device 300 may be used to load and unload containers onto the item manipulation device 300, such that two containers can be moved at the same time, thereby increasing throughput. The item manipulation device 300 may satisfy end of arm tool weight restrictions to allow for use with existing robotic manipulators. The item manipulation device 300 may further have a minimalist design so as to reduce manufacturing and operational complexity, as well as maintenance requirements. For example, in some embodiments, the item manipulation device 300 may be operable using one line for air (e.g., for a pneumatic actuator, etc.), and one line for vacuum (e.g., for suction cups, etc.).

The item manipulation device 300 may include a number of cantilevered rollers 320 that form part of a conveyance surface onto which containers can be pulled and/or pushed off of. The cantilevered rollers may be arranged in different configurations. For instance, in the example of FIG. 6, the cantilevered rollers may be arranged in pairs, where a first container slot has a first pair of cantilevered rollers, and a second container slot has a second pair of cantilevered rollers. In other embodiments, a single set of longer cantilevered rollers may be used for each container slot, or full-length rollers may be used instead of cantilevered rollers. Cantilevered rollers may reduce a total weight of the item manipulation device 300. The cantilevered rollers 320 may be actively driven using one or more motors or other actuators in some embodiments. In other embodiments, the cantilevered rollers 320 may be passive rollers. The cantilevered rollers 320 may form at least part of a conveyance surface that is coupled to the support platform 310. Containers can be moved over the conveyance surface from a first end of the support platform 310 to a second end of the support platform 310. The item manipulation device 300 can be coupled to a robotic manipulator via a mating quick-attachment connector, as discussed with respect to FIGS. 1-4. In some embodiments, the conveyance surface may be a passive surface that includes the cantilevered rollers 320. For example, the passive conveyance surface may include a first set of cantilevered rollers disposed along a first side of the support platform 310 for a first container slot, and a second set of cantilevered rollers disposed along a second side of the support platform 310.

The item manipulation device 300 may include a linear actuator 330. The linear actuator 330 may be disposed about a center or a middle portion of the support platform 310. The linear actuator 330 may be disposed between the two sets of cantilevered rollers 320 in embodiments that include two sets of cantilevered rollers 320, such as that illustrated in FIG. 5. The linear actuator 330 may be a first actuator of the item manipulation device 300. The linear actuator 330 may extend along some or all of a length of the conveyance surface. The linear actuator 330 may be a linear electric actuator, and may be disposed about a middle portion of the conveyance surface. In other embodiments, different types of actuators may be used, such as a ball screw actuator, a pneumatic actuator, a belt driven actuator, a motor driven actuator, a solenoid, and so forth. Any suitable type of actuator that can produce a stroke length equal to a length of a container that is to be handled by the item manipulation device 300 can be used.

The linear actuator 330 may be coupled to a lower surface of the support platform 310. In some embodiments, the support platform 310 may include an opening adjacent to which the linear actuator 330 may be coupled. A sliding component 332 may be coupled to the linear actuator 330, and may be disposed at least partially in the opening of the support platform 310. The sliding component 332 may be configured to be actuated in directions 334 via the linear actuator 330. The sliding component 332 may be configured to be actuated from a first end of the linear actuator 330 to a second end of the linear actuator 330.

The item manipulation device 300 may include a second actuator, which may be a rotary actuator 340. The rotary actuator 340 may be coupled to the sliding component 332. In some embodiments, the rotary actuator 340 may otherwise be configured to move along a length of the support platform 310 via the linear actuator 330. The rotary actuator 340 may therefore be configured to move from a first end of the linear actuator 330 to a second end of the linear actuator 330. In some embodiments, the rotary actuator 340 may be indirectly coupled to the linear actuator 330.

The item manipulation device 300 may include a member 350 that is coupled to the rotary actuator 340. The rotary actuator 340 may be configured to actuate in a rotary manner. For example, the rotary actuator 340 may be configured to actuate the member 350 from a first position adjacent to the first container slot of the item manipulation device 300 to a second position adjacent to the second container slot of the item manipulation device 300. The member 350 may therefore be configured to be actuated from a first position to a second position via the rotary actuator 340. The rotary actuator 340 may be any suitable actuator configured to cause the member 350 to rotate or pivot. In some embodiments, the rotary actuator 340 can rotate between 0 degrees and 180 degrees relative to horizontal and/or can rotate 360 degrees, although any other suitable range of motion may be utilized. The rotary actuator 340 can be or include a motor, a stepper motor, a rotational motor, and/or any suitable device for rotating the member 350.

The item manipulation device 300 may include a suction cup assembly 360. The suction cup assembly 360 may include one or more suction cups coupled to a body 362. For example, the suction cup assembly 360 may include a first suction cup 364 disposed on a first side of the body 362, and a second suction cup 366 disposed on a second side of the body 362. Any number of suction cups may be included. The illustrated embodiment may allow for containers to be engaged using either side of the suction cup assembly 360. For example, the first suction cup 364 may be used to pull a container onto the item manipulation device 300 from a right side of the page, and the second suction cup 366 may be used to push the container off of the item manipulation device 300.

Because the suction cup assembly 360 is coupled to the rotary actuator 340 via the member 350, the suction cup assembly 360 may be used to load and/or unload containers in both of the container slots of the item manipulation device 300, as discussed with respect to FIGS. 6-11. The suction cup assembly 360 may be engaged with a container to move the container onto and off of the conveyance surface. The suction cup assembly 360 may include the first suction cup 364 oriented in a first direction, and the second suction cup 366 oriented in a second direction.

In some embodiments, the suction cup assembly 360 may include an optional actuator that is configured to actuate the first suction cup 364 outwards from the body 362 in the first direction, and/or to actuate the second suction cup 366 outwards from the body 362 in the second direction. The actuator may be a pneumatic actuator or another suitable type of actuator. The actuation of the first suction cup 364 and/or second suction cup 366 may provide increased range of motion and may allow for increased reach of the item manipulation device 300 when engaging containers. In some embodiments, actuation of the suction cups may allow for improved grasp or engagement between a suction cup and a container. For example, by actuating outwards by one inch (or another distance), a distance between the suction cup and a container surface can be reduced, and can allow for improved suction due to increased surface area of contact between the container surface and the respective suction cup.

In other embodiments, instead of including an actuator at the suction cup assembly 360, which may complicate design of the item manipulation device 300, a length of the linear actuator 330 may be increased such that a stroke length of the linear actuator 330 is greater than a length of the container. This may allow for additional movement of the suction cup assembly 360 itself, thereby removing a need for actuation of individual suction cups. Accordingly, in one embodiment, the first actuator or the linear actuator 330 may have a length that is greater than the length of the conveyance surface.

In some embodiments, the suction cup assembly 360 can be operated to assist with advancing the container 102 onto the container conveyance assembly. The container 102 can be conveyed until some, all, or substantially all of the container is positioned in the container passage 114 and/or on the container conveyance assembly 204. The container 102 can be conveyed without the container manipulation assembly interfering with the container.

Once the container 102 is loaded, the robotic manipulator 110 may be operated to reposition the container transport 104 and the container 102. The robotic manipulator 110 can move the container transport 104 and the container 102 to a position for unloading of the container. The container 102 can be positioned inside or substantially inside the container passage 114 when the robotic manipulator 110 is repositioning the container transport 104 and the container.

To unload the container 102, the suction cup assembly 360 may be operated to advance the container 102 off of the container conveyance assembly. The container 102 can be conveyed until a portion of the container is off of the container conveyance assembly 204 and/or outside of the container passage 114.

In some embodiments, the suction cup assembly 360 may be operated to engage with the container 102. For example, if the container cannot be fully unloaded using the container conveyance assembly, the suction cup assembly 360 may be operated to "nudge" or push a side of the container 102 to assist with unloading the container 102.

The suction cup assembly 360 can push the container 102 until the container and/or a portion of the container manipulation assembly is outside of the container passage 114. The container 102 may be pushed onto an output station 112 or other surface within a warehouse environment. The container 102 can be moved off of the container conveyance assembly 204 on a side opposite the side where the container was moved onto the conveyance assembly. For example, the container 102 can be moved onto a front side of the container conveyance assembly 204 and be moved off of a rear side of the conveyance assembly. However, the container 102 may be moved off of the container conveyance assembly 204 on the same side where the container was moved onto the conveyance assembly. For example, the container 102 may be moved onto the front side of the container conveyance assembly 204 and be moved off of the front side of the conveyance assembly.

In a cross-sectional view of a portion of the item manipulation device 300 depicted in FIG. 5, the linear actuator 330 is depicted. The linear actuator 330 may be disposed below the support platform 310 (e.g., coupled to a lower surface of the support platform 310, etc.). The rotary actuator 340 may be coupled to the linear actuator 330 via the sliding component, and may be configured to slide in directions 334 along some or all of the length of the linear actuator 330. The member 350 may be coupled to the rotary actuator 340. The suction cup assembly 360 may be coupled to the member 350. The suction cup assembly 360 may be a dual-sided suction cup actuator, where the suction cups can be individually actuated in directions depicted by arrows in FIG. 5.

The item manipulation device 300 may therefore be part of a system that includes a robotic manipulator, such as a robotic arm. The item manipulation device 300 may included with a container manipulator assembly. The item manipulation device 300 may include the linear actuator 330 disposed along a longitudinal axis of the item manipulation device 300. The item manipulation device 300 may include the sliding component 332 configured to be actuated by the linear actuator 330 to slide along a length of the linear actuator 330. The item manipulation device 300 may include the rotary actuator 340 coupled to the sliding component 332. The item manipulation device 300 may include the member 350 that may have a first end and a second end, the member coupled to the rotary actuator 340 at the first end, where the member 350 may be configured to rotate from a first position at a first side of the support platform 310 to a second position at a second side of the support platform 310. The item manipulation device 300 may include the suction cup assembly 360 coupled to the second end of the member, the suction cup assembly 360 including the first suction cup 364 oriented in a first direction, and the second suction cup 366 oriented in a second direction that is opposite the first direction.

Figure 6:
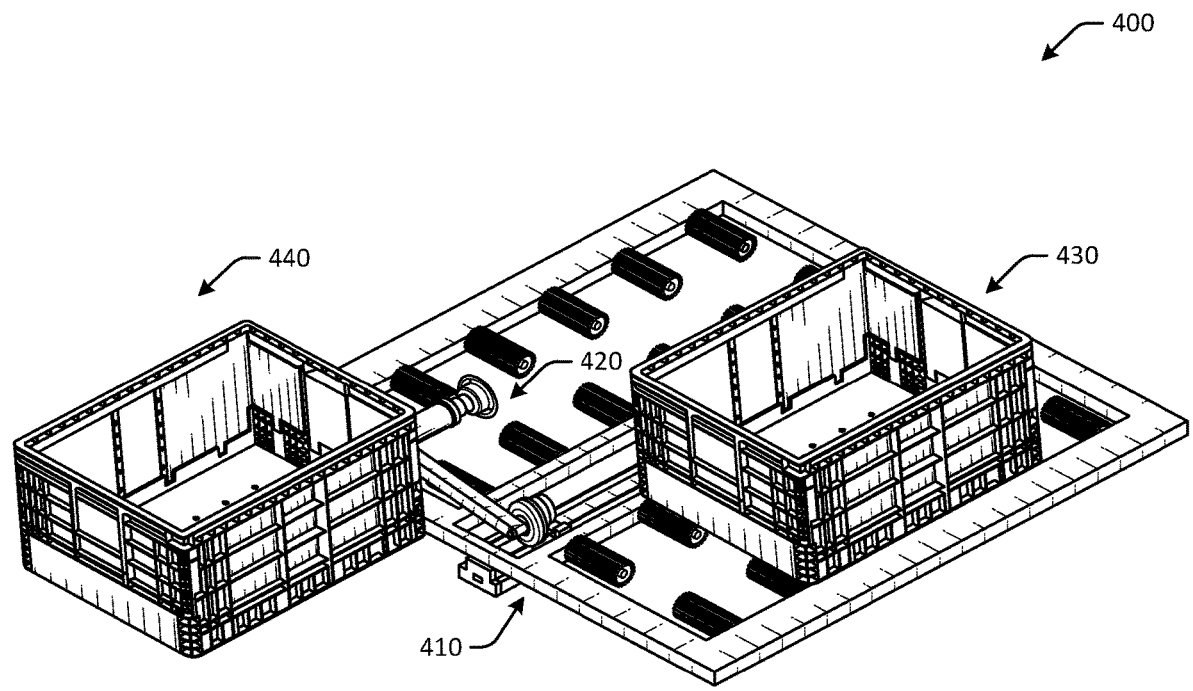
FIGS. 6-11 are schematic illustrations of the item manipulation device of FIG. 5 in isolated view in various stages of loading and unloading multiple containers in accordance with one or more embodiments of the disclosure.

In an example process flow 370 depicted in FIG. 6, a method of operation of the item manipulation device 300 is provided. At block 372, the slider or sliding component 332 may be positioned using the linear actuator 330. For example, the sliding component 332 may be positioned at either end of the linear actuator 330 depending on whether a container is to be loaded into a container slot (in which case the slider is moved adjacent to the container, etc.) or whether a container is to be unloaded from a container slot (in which case the slider is moved to an end of the container from which the container can be pushed off the item manipulation device 300, etc.).

At block 374, the suction cup assembly 360 may be positioned using the rotary actuator 360 and the member 350. For example, the suction cup assembly 360 may be moved into position at the first container slot or the second container slot via actuation of the rotary actuator 340.

At optional block 376, a suction cup of the suction cup assembly 360 may be actuated. For embodiments that include an actuator at the suction cup assembly 360, the suction cup adjacent to the container may be actuated to position the suction cup closer to the container.

At block 378, air flow at the suction cup may be activated. For example, to load a container, vacuum flow may be activated at the suction cup to assist in grasping the container. To unload a container, optional positive air pressure may be activated at the suction cup to assist unloading the container. In some embodiments, vacuum flow may be activated during unloading of containers to maintain control over the container during unloading. Some embodiments may have continuous suction flow at one or both suction cups of the suction cup assembly 360.

FIGS. 6-11 are schematic illustrations of the item manipulation device of FIG. 5 in isolated view in various stages of loading and unloading multiple containers in accordance with one or more embodiments of the disclosure. Other embodiments may include additional or fewer components. The illustration of FIGS. 6-11 are not to scale, and may not be illustrated to scale with respect to other figures. Other embodiments may have different components.

FIGS. 6-11 depict an item manipulation device 400 in various stages of operation. As discussed, the item manipulation device 400 may be used to transport two containers at the same time, which may improve throughput. In some embodiments, the item manipulation device 400 may be used to remove full containers from a tote pod or other location, and to replace the full container with an empty container (or another container that is at least partially full) with minimal downtime.

Referring to FIG. 6, the item manipulation device 400 may include a first container slot and a second container slot. A first container 430 may be loaded onto the item manipulation device 400 in a first container slot. The first container 430 may have been loaded from a mobile drive unit from a right hand side of the page (or from another source). The item manipulation device 400 may be positioned adjacent to a tote pod or other location from which a second container 440 may be loaded onto the item manipulation device 400. To load the second container 440, the item manipulation device 400 may position a linear actuator 410 at an end of the item manipulation device 400 adjacent to the second container 440. A suction cup assembly 420 may be rotated to the second container slot via a rotary actuator. The suction cup of the suction cup assembly 420 adjacent to the second container 440 may be used to grasp the second container 440, and to pull the second container onto the item manipulation device 400. Once the suction cup is engaged, the linear actuator 410 may actuate the sliding component to an opposite end, such that the second container 440 is pulled by the suction cup assembly 420 onto the item manipulation device 400.

Figure 7:
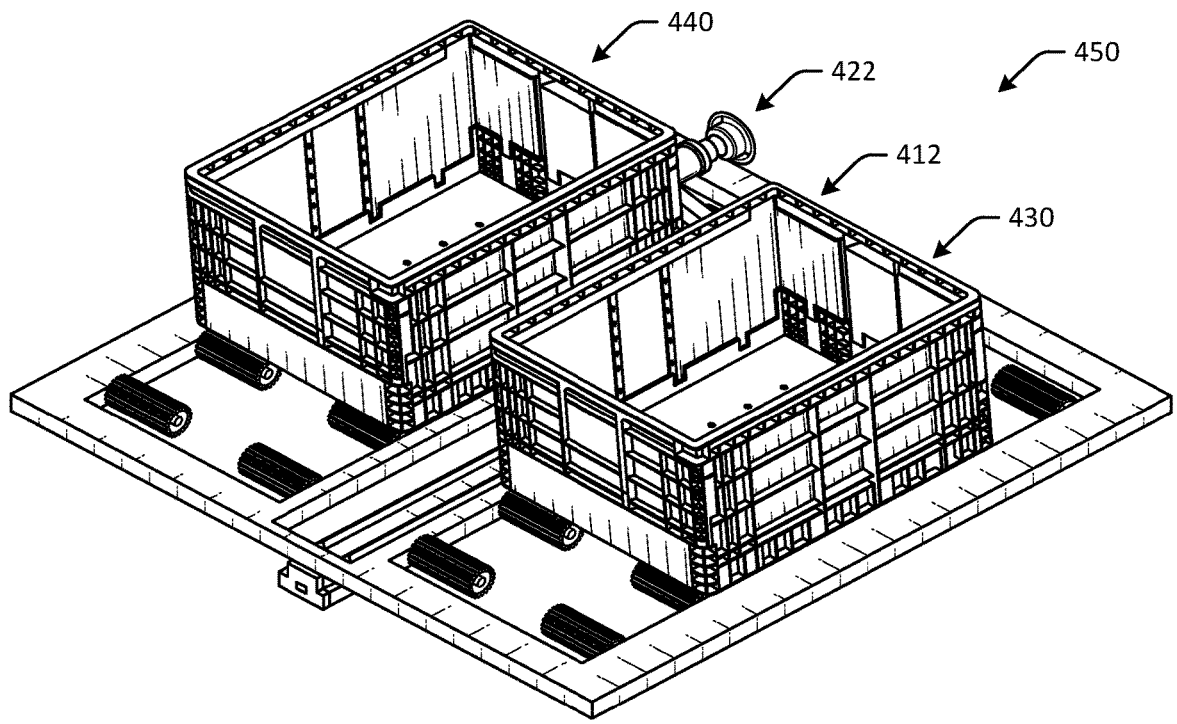
Figure 7:
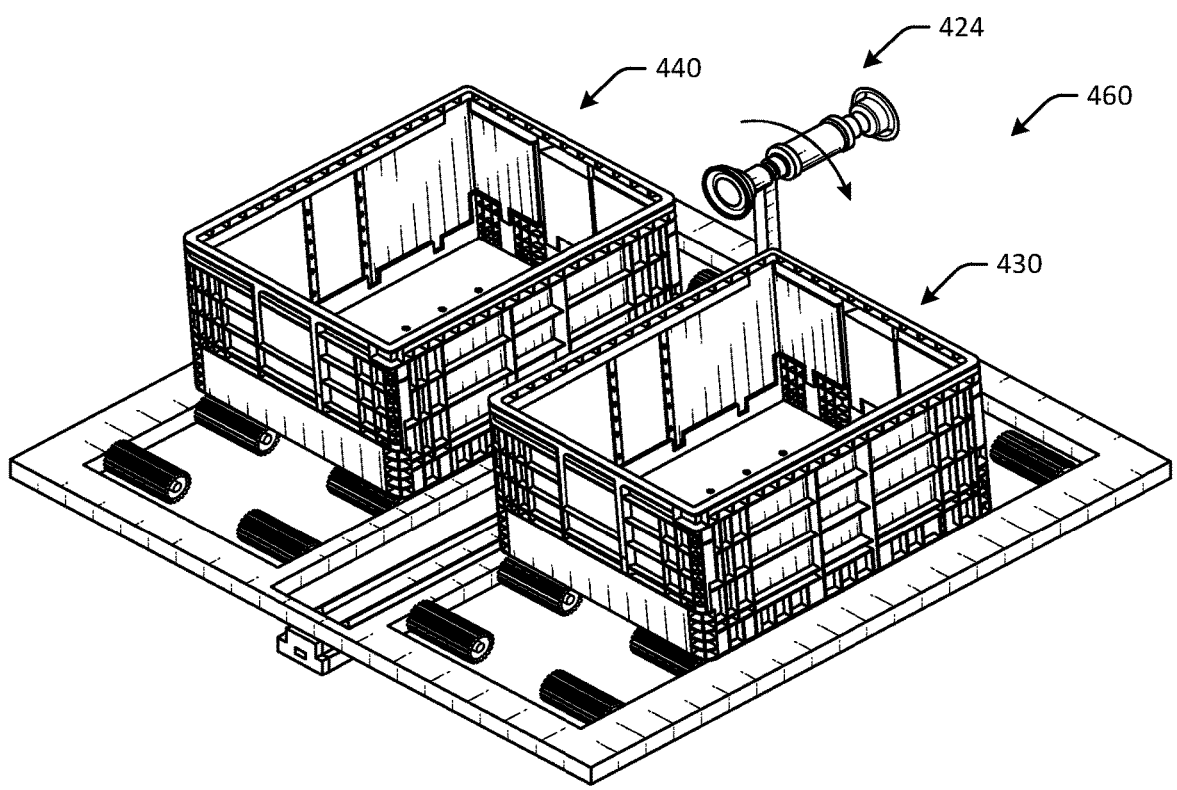

In FIG. 7, at a second point in time 450, the second container 440 is loaded onto the item manipulation device 400. The suction cup assembly may be disposed at a distal end 412 of the item manipulation device 400. The suction cup assembly may disengage from the second container 440 (e.g., the suction may be moved to a deactivated state 422). The second container 440 is disposed in the second container slot of the item manipulation device 400, and is disposed adjacent to the first container 430 that is in the first container slot. Both containers may be transported by the item manipulation device 400 after loading is complete. The robotic manipulator may move the item manipulation device 400 to another destination. If the second container 440 is be replaced at the tote pod with the first container 430, the robotic manipulator may position the item manipulation device 400 such that the first container 430 is aligned with the empty slot in the tote pod created by removal of the second container 440.

At a third point in time 460, the suction cup assembly may be rotated 424 from the second container slot to the first container slot via the rotary actuator, so as to position behind the first container 430 that is to be pushed into the tote pod to replace the second container 440.

Figure 8:
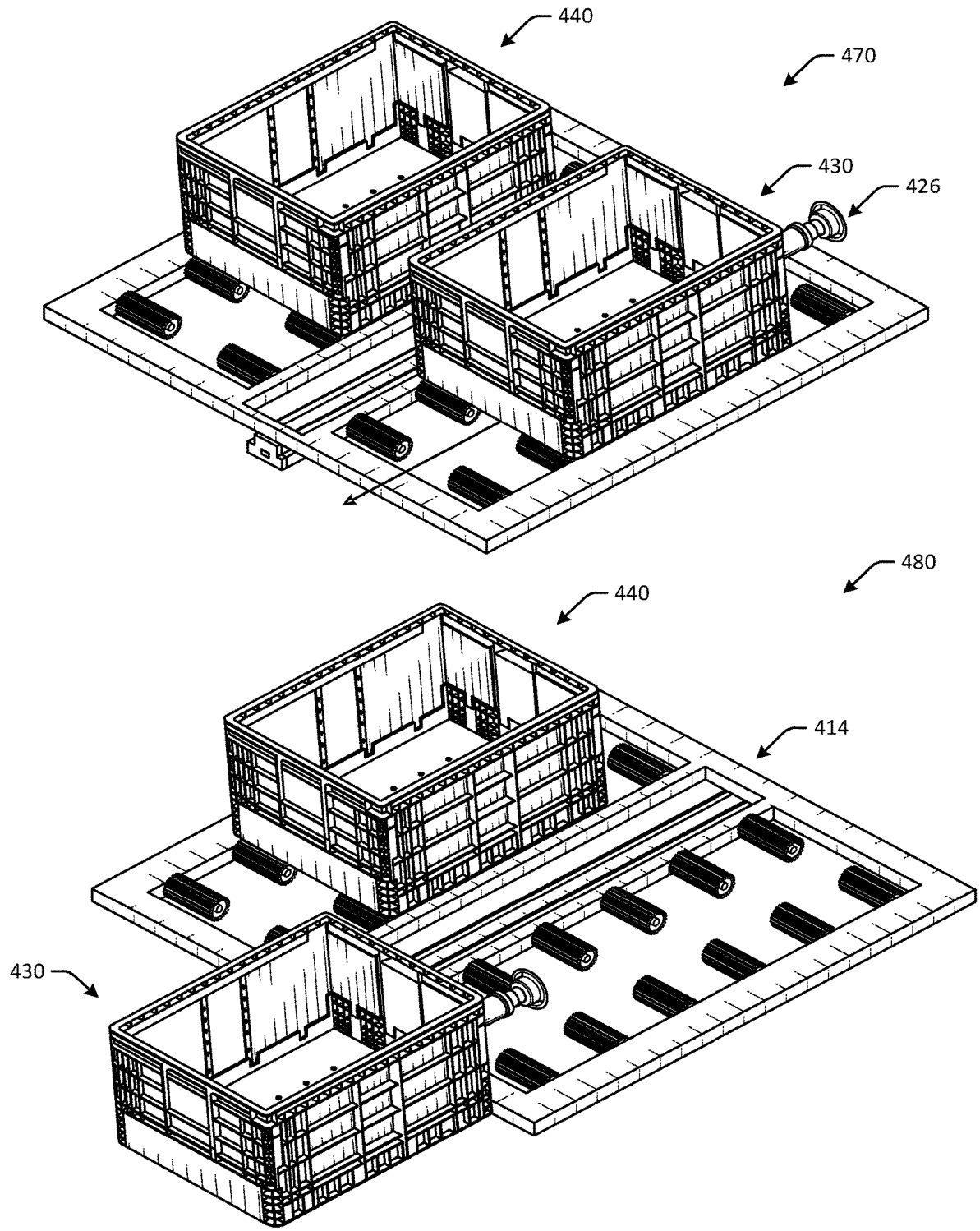

In FIG. 8, at a fourth point in time 470, the suction cup assembly may be positioned at the second container slot 426 adjacent to the first container 430. The suction cup assembly may be used to push the first container 430 off the item manipulation device 400 via actuation of the linear actuator, which causes the suction cup assembly to push the first container 430 in the direction of the arrow depicted in the example of FIG. 8.

At a fifth point in time 480, the first container 430 may be unloaded from the item manipulation device 400. The first container 430 may be fully unloaded by the suction cup assembly when the linear actuator has actuated the slider component to an end of the linear actuator 414.

Figure 9:
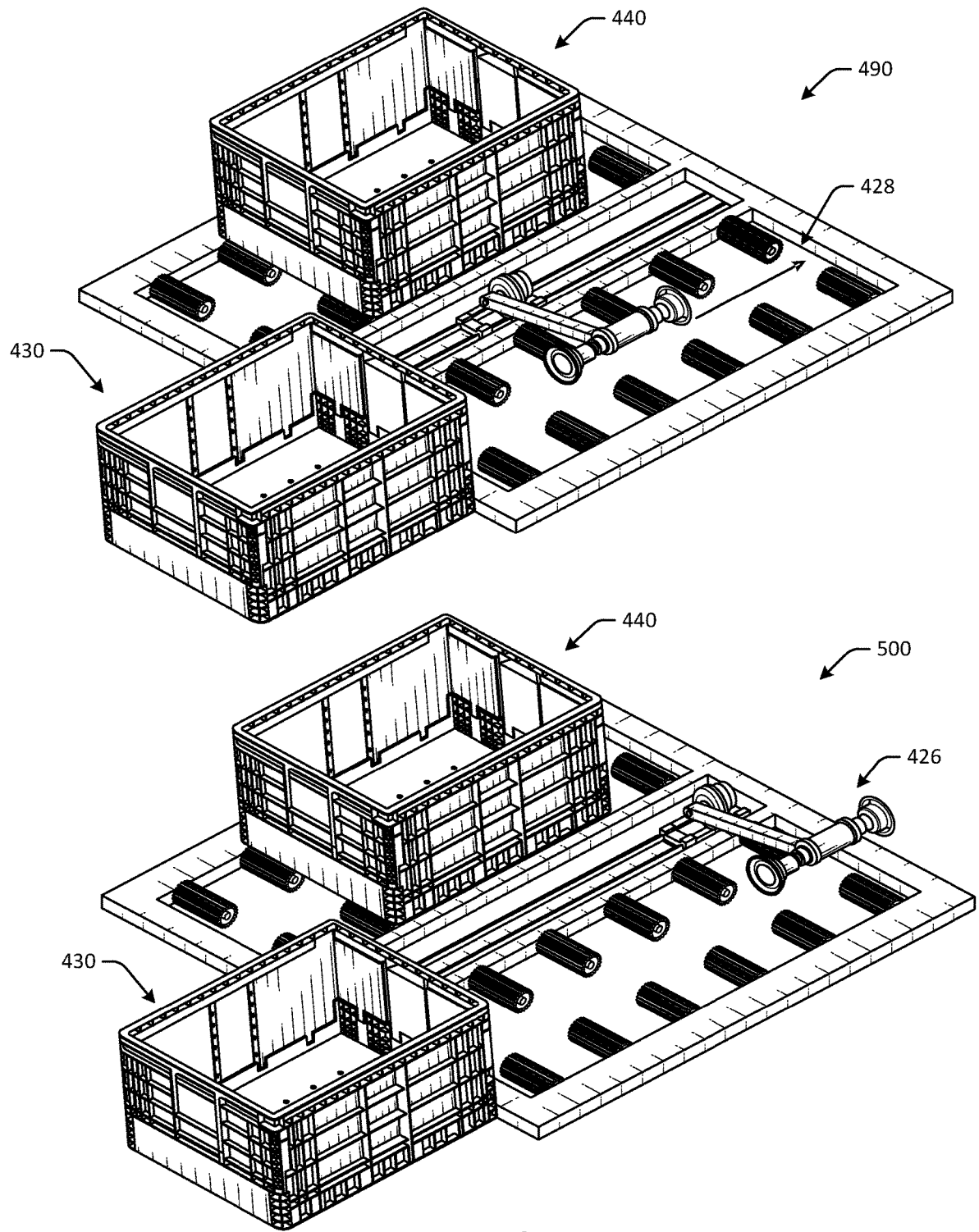

In FIG. 9, at a sixth point in time 490, the suction cup may disengage 428 from the first container 430, and may be moved back to the opposite end of the item manipulation device 400 via the linear actuator. The suction cup assembly may be used to load another container onto the item manipulation device 400 in the now empty first container slot. The suction cup assembly may also be configured to unload the second container 440 onto a mobile drive unit or other destination. The robotic manipulator may therefore position the item manipulation device 400 accordingly, such that the appropriate container slot is aligned with the container to load and/or container slot into which a container is to be unloaded.

At a seventh point in time 500, the suction cup assembly may return to the distal end 426 of the item manipulation device 400. The suction cup assembly may be prepared to pick or grasp another container for loading onto the item manipulation device 400 in the first container slot in the example of FIG. 9.

Figure 10:
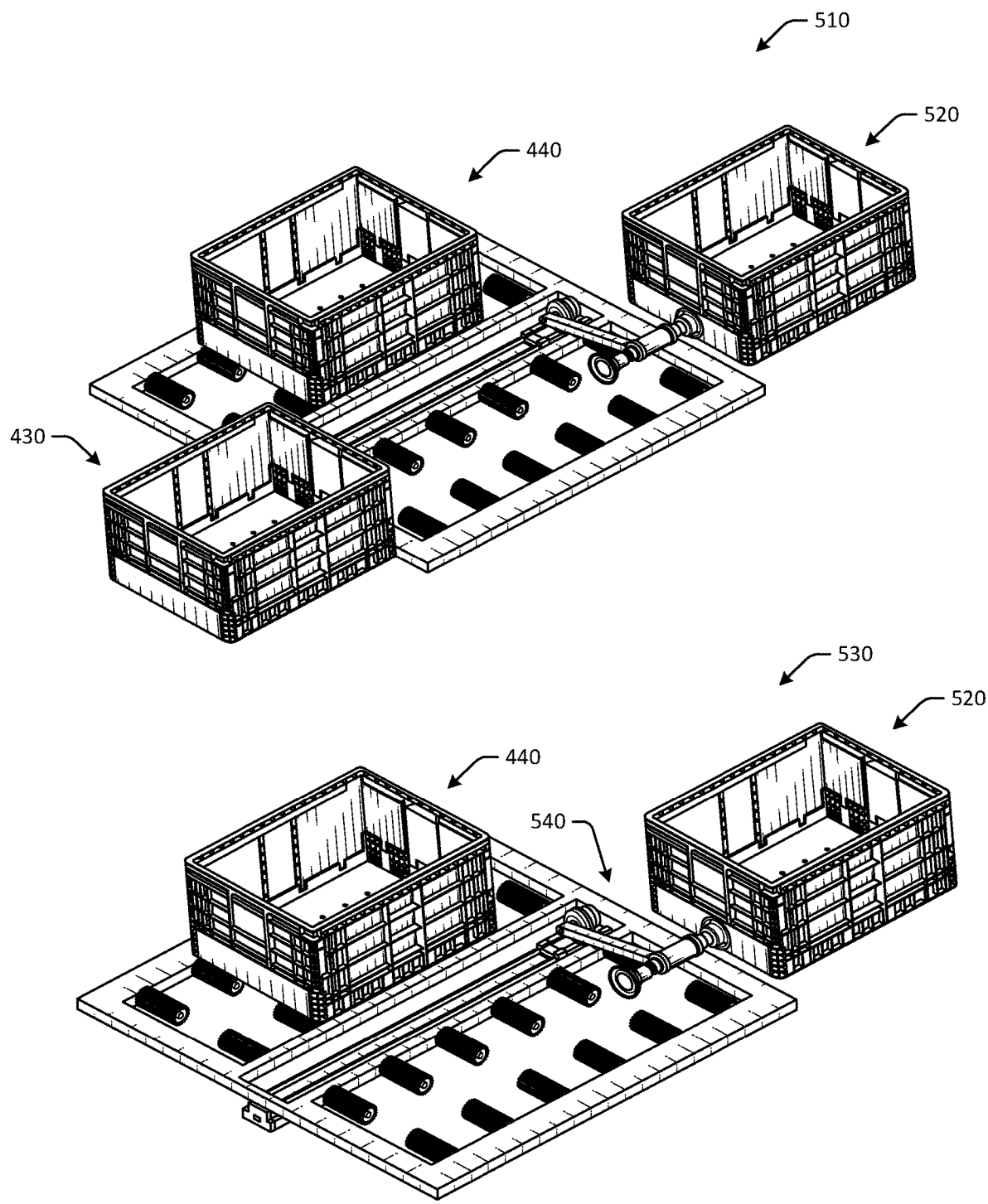

In FIG. 10, at an eighth point in time 510, a third container 520 may be loaded into the first container slot of the item manipulation device 400 using the suction cup assembly. At a ninth point in time 530, the suction cup may engage the third container 520 and the linear actuator may begin to actuate the sliding component 540 to the opposite end so as to pull the third container 520 onto the item manipulation device 400. In the meantime, in the example of FIG. 10, the tote pod in which the first container 430 was placed may be removed at the ninth point in time 530.

Figure 11:
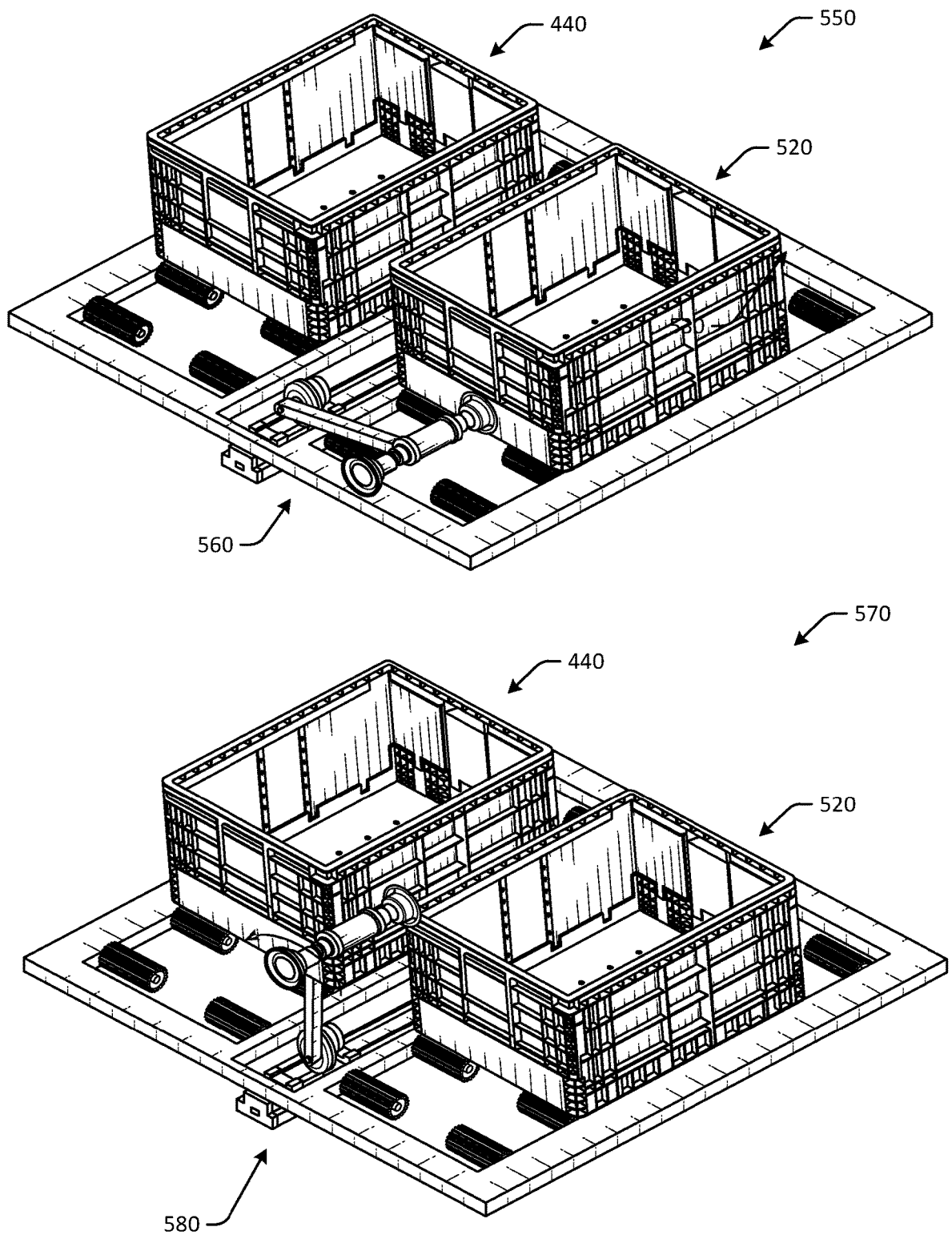

In FIG. 11, at a tenth point in time 550, the third container 520 may be loaded onto the item manipulation device 400 adjacent to the second container 440. The suction cup assembly may therefore be disposed at an opposite end 560 of the item manipulation device 400. The item manipulation device 400 may be moved using the robotic manipulator with both containers loaded thereon.

At an eleventh point in time 570, the suction cup assembly may be rotated via actuation of the rotary actuator 580 to the second container slot so as to unload the second container 440 from the item manipulation device 400 onto, for example, a mobile drive unit or other destination. The robotic manipulator may move the item manipulation device 400 into position, so as to align the second container slot with the destination of the second container 440. The item manipulation device 400 may then unload the second container 440 using the suction cup assembly and actuation of the sliding component coupled to the linear actuator.

In this manner, containers can continuously be exchanged between two destinations, such as a mobile drive unit field or other robotic field, and tote pods or other container storage systems with minimal downtime due to the dual container capacity of the item manipulation device 400.

To handle containers, the item manipulation device 400 may be coupled to a computer system or controller that may cause a container transporter and/or the item manipulation device 400 to perform one or more of the operations. For example, the controller may cause the first actuator, such as the linear actuator, to actuate a sliding component to a first end of the first actuator. The controller may cause a rotary actuator to actuate a member to a first position. The controller may cause activation of a suction at a suction cup assembly to engage a first container. In some embodiments, the controller may optionally cause a second actuator to actuate a first suction cup of the suction cup assembly prior to activating suction at the suction cup assembly to engage the first container. The controller may cause the linear actuator to actuate the sliding component to a second end of the first actuator, so as to pull the container onto the item manipulation device. The controller may cause deactivation of suction at the first suction cup to disengage the first container.

The controller may cause the rotary actuator to actuate the member to a second position. The controller may cause activation of suction at the suction cup assembly to engage a second container. The controller may optionally cause the second actuator to actuate a second suction cup of the suction cup assembly prior to activating suction at the suction cup assembly to engage the second container. The controller may cause first actuator to actuate the sliding component to the first end of the first actuator, so as to unload a container.

To unload containers, in some embodiments, the conveyance assembly may be actuated. In some embodiments, containers may be unloaded using the cantilevered rollers. In some embodiments, containers can be unloaded using either suction cup of the suction cup assembly. For example, the controller may cause a first suction cup assembly to push a container off of a conveyance surface of the item manipulation device. The controller may cause a second suction cup to push the first container off of a conveyance surface of the item manipulation device (e.g., the opposite facing suction cup can be used to push containers off the item manipulation device, etc.).

In some embodiments, the item manipulation device may be coupled to a computer system or a controller that causes the item manipulation device to perform certain operations. For example, the controller may be configured to cause the first actuator (e.g., the linear actuator) to actuate the sliding component to the first end of the first actuator, and to cause the rotary actuator to actuate the member to the first position. The controller may be configured to activate suction at the suction cup assembly to engage a first container, and to cause the first actuator to actuate the sliding component to the second end of the first actuator. The controller may be configured to cause the rotary actuator to actuate the member to the second position, and to activate suction at the suction cup assembly to engage a second container. The controller may cause the first actuator to actuate the sliding component to the first end of the first actuator. In embodiments where the suction cup assembly includes a first suction cup, a second suction cup, and a second actuator, the second actuator may be configured to actuate the first suction cup and the second suction cup. The controller may be further configured to cause the second actuator to actuate the first suction cup prior to activating suction at the suction cup assembly to engage the first container, and to cause the second actuator to actuate the second suction cup prior to activating suction at the suction cup assembly to engage the second container.

One or more operations of the methods, process flows, or use cases of FIGS. 1-11 may have been described above as being performed by a user device, or more specifically, by one or more program module(s), applications, or the like executing on a device. It should be appreciated, however, that any of the operations of the methods, process flows, or use cases of FIGS. 1-11 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-11 may be described in the context of the illustrative devices, it should be appreciated that such operations may be implemented in connection with numerous other device configurations.

The operations described and depicted in the illustrative methods, process flows, and use cases of FIGS. 1-11 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 12:
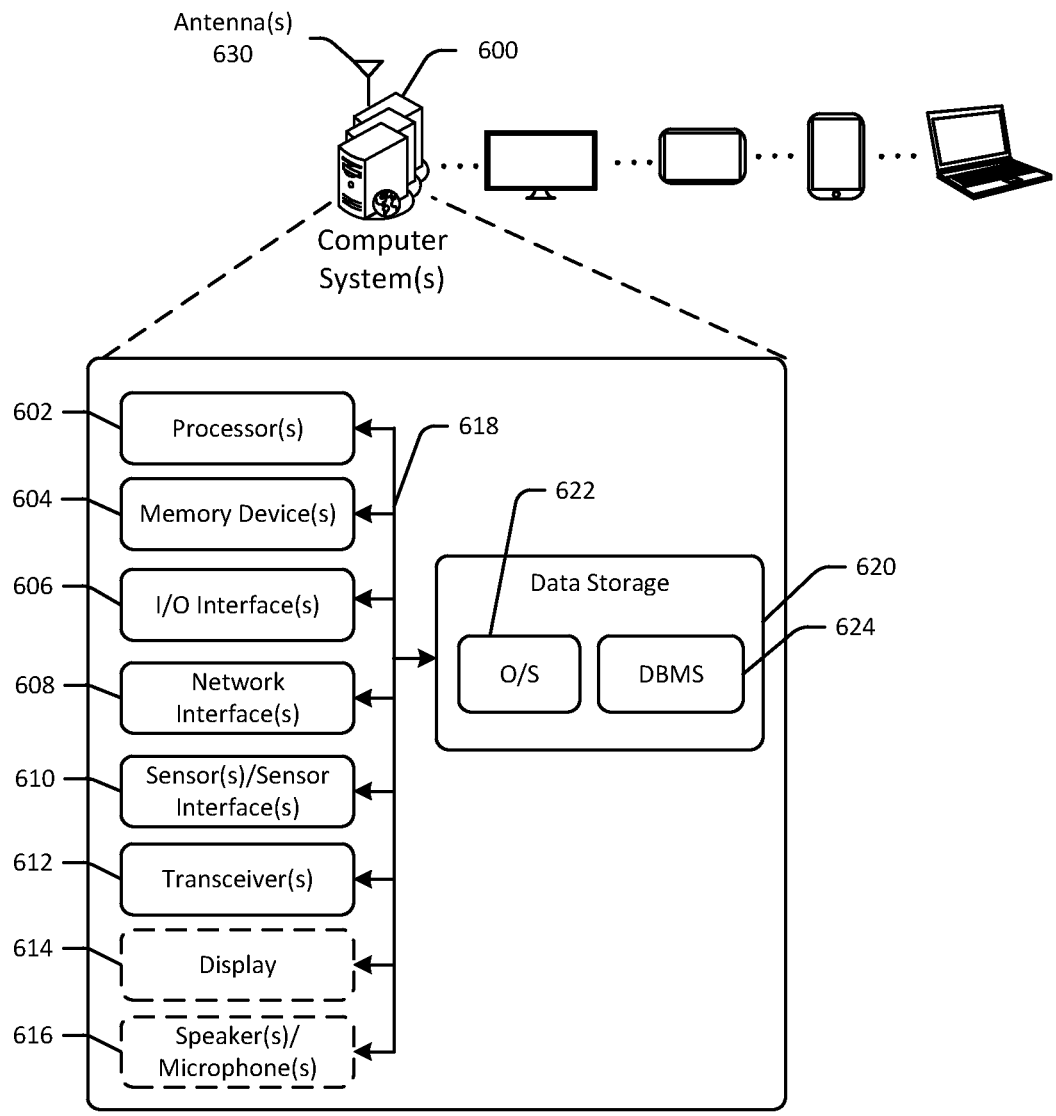
FIG. 12 schematically illustrates an example architecture of a computer system associated with a container transporter system in accordance with one or more embodiments of the disclosure.

FIG. 12 is a schematic block diagram of one or more illustrative computer system(s) 600 in accordance with one or more example embodiments of the disclosure. The computer system(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 600 may correspond to an illustrative device configuration for the device(s) of FIGS. 1-11. For example, the computer system(s) 600 may control one or more aspects of the container transporters described in FIGS. 1-11, such as determining when to actuate certain components, when to rotate members, when to actuate suction cups, when to activate suction or air pressure at a suction cup, where a robotic arm or other device is to position a picking assembly, and so forth.

The computer system(s) 600 may be configured to communicate with one or more servers, user devices, cameras, or the like. The computer system(s) 600 may be configured to identify items, retrieve items or containers, move items or containers, and so forth.

The computer system(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display(s) 614, one or more optional microphone(s) 616, and data storage 620. The computer system(s) 600 may further include one or more bus(es) 618 that functionally couple various components of the computer system(s) 600. The computer system(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the computer system(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the computer system(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the computer system(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the computer system(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the computer system(s) 600 and the hardware resources of the computer system(s) 600. More specifically, the O/S 622 may include a set of computer-executable instructions for managing the hardware resources of the computer system(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 600 is a mobile device, the DBMS 624 may be any suitable lightweight DBMS optimized for performance on a mobile device.

Referring now to other illustrative components of the computer system(s) 600, the input/output (I/O) interface(s) 606 may facilitate the receipt of input information by the computer system(s) 600 from one or more I/O devices as well as the output of information from the computer system(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 600 may further include one or more network interface(s) 608 via which the computer system(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antennas may include directional antennas, non-directional antennas, dipole antennas, folded dipole antennas, patch antennas, multiple-input multiple-output (MIMO) antennas, or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHZ channels (e.g., 802.11n, 802.11ac), or 60 GHz channels (e.g., 802.11 ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630—transmitting or receiving radio frequency (RF) signals in the bandwidth and/or channels corresponding to the communications protocols utilized by the computer system(s) 600 to communicate with other devices. The transceiver(s) 612 may include hardware, software, and/or firmware for modulating, transmitting, or receiving—potentially in cooperation with any of antenna(s) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computer system(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 12 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 600, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computer system(s) 600 may include alternate and/or additional hardware, software, or firmware components beyond those described or depicted without departing from the scope of the disclosure. More particularly, it should be appreciated that software, firmware, or hardware components depicted as forming part of the computer system(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a robotic arm; and
   an item manipulation device coupled to the robotic arm, the item manipulation device comprising:
   a support platform having an attachment point configured to engage with and be supported by the robotic arm;
   a passive conveyance assembly coupled with the support platform and comprising a passive conveyance surface configured to receive a container on the passive conveyance surface, wherein the container can be moved between a front side and a rear side of a container passage having a bottom side at least partially defined by the passive conveyance surface;
   a container manipulator assembly coupled to the support platform, the container manipulator assembly comprising:
   a linear actuator disposed along a longitudinal axis of the item manipulation device;
   a sliding component configured to be actuated by the linear actuator to slide along a length of the linear actuator;
   a rotary actuator coupled to the sliding component, wherein the rotary actuator is configured to rotate a member from a first position at a first side of the support platform to a second position at a second side of the support platform;
   the member comprising a first end and a second end, wherein the member is coupled to the rotary actuator at the first end; and a suction cup assembly coupled to the second end of the member, the suction cup assembly comprising:
a first suction cup oriented in a first direction;
a second suction cup oriented in a second direction that is opposite the first direction;
a body, wherein the first suction cup is coupled to a first side of the body and the second suction cup is coupled to a second side of the body; and
an actuator configured to actuate the first suction cup outward from the first side of the body, and to actuate the second suction cup outward from the second side of the body.

2. The system of claim 1, further comprising:
a controller configured to:
cause the linear actuator to actuate the sliding component to a first end of the linear actuator;
cause the rotary actuator to actuate the member to the first side of the support platform;
activate suction at the first suction cup to engage a first container;
cause the linear actuator to actuate the sliding component to a second end of the linear actuator while the first container is engaged, such that the first container is pulled onto the passive conveyance surface;
deactivate suction at the first suction cup to disengage the first container;
cause the rotary actuator to actuate the member to the second side of the support platform;
activate suction at the second suction cup to engage a second container; and
cause the linear actuator to actuate the sliding component to the first end of the linear actuator while the second container is engaged, such that the second container is pulled onto the passive conveyance surface adjacent to the first container.

3. The system of claim 1, wherein the passive conveyance surface comprises a first set of cantilevered rollers disposed along a first side of the support platform, and a second set of cantilevered rollers disposed along a second side of the support platform.

4. An item manipulation device comprising:
a support platform;
a conveyance surface coupled to the support platform, wherein containers can be moved over the conveyance surface from a first end of the support platform to a second end of the support platform;
a first actuator extending along a length of the conveyance surface;
a sliding component configured to be actuated from a first end of the first actuator to a second end of the first actuator;
a rotary actuator coupled to the sliding component;
a member coupled to the rotary actuator, the member configured to be actuated from a first position to a second position via the rotary actuator; and
a suction cup assembly coupled to the member, the suction cup assembly comprising:
a first suction cup;
a second suction cup;
a body; and
a second actuator configured to actuate the first suction cup outwards from the body in the first direction, and to actuate the second suction cup outwards from the body in the second direction.

5. The item manipulation device of claim 4, wherein the suction cup assembly can be engaged with a container to move the container onto and off of the conveyance surface.

6. The item manipulation device of claim 4, wherein:
the first suction cup is oriented in a first direction; and
the second suction cup is oriented in a second direction.

7. The item manipulation device of claim 4, wherein the first actuator is a linear electric actuator, and the second actuator is a pneumatic actuator.

8. The item manipulation device of claim 4, wherein the first actuator is disposed about a middle portion of the conveyance surface.

9. The item manipulation device of claim 4, further comprising:
a controller configured to:
cause the first actuator to actuate the sliding component to the first end of the first actuator;
cause the rotary actuator to actuate the member to the first position;
activate suction at the suction cup assembly to engage a first container;
cause the first actuator to actuate the sliding component to the second end of the first actuator;
cause the rotary actuator to actuate the member to the second position;
activate suction at the suction cup assembly to engage a second container; and
cause the first actuator to actuate the sliding component to the first end of the first actuator.

10. The item manipulation device of claim 9, wherein the suction cup assembly comprises a first suction cup, a second suction cup, and a second actuator configured to actuate the first suction cup and the second suction cup, and wherein the controller is further configured to:
cause the second actuator to actuate the first suction cup prior to activating suction at the suction cup assembly to engage the first container; and
cause the second actuator to actuate the second suction cup prior to activating suction at the suction cup assembly to engage the second container.

11. The item manipulation device of claim 4, further comprising:
one or more sensors for obtaining data associated with a container, the one or more sensors comprising at least one of: an optical sensor, a camera, a scanner, or a weight sensor.

12. The item manipulation device of claim 4, wherein the conveyance surface is a passive surface comprising cantilevered rollers.

13. The item manipulation device of claim 4, wherein the item manipulation device is coupled to a robotic manipulator via a mating quick-attachment connector.

14. A method comprising:
causing, by a controller coupled to an item manipulation device, a first actuator to actuate a sliding component to a first end of the first actuator;
causing a rotary actuator to actuate a member to a first position adjacent to a first container;
causing a second actuator to actuate a first suction cup of a suction cup assembly;
activating suction at the suction cup assembly to engage the first container;
causing the first actuator to actuate the sliding component to a second end of the first actuator;
causing the rotary actuator to actuate the member to a second position adjacent to a second container;
activating suction at the suction cup assembly to engage the second container; and causing the first actuator to actuate the sliding component to the first end of the first actuator the suction cup assembly coupled to the member, the suction cup assembly comprising;

the first suction cup;

a second suction cup;

a body; and the second actuator configured to actuate the first suction cup outwards from the body in a first direction, and to actuate the second suction cup outwards from the body in a second direction.

15. The method of claim 14, further comprising:

causing the second actuator to actuate the second suction cup of the suction cup assembly prior to activating suction at the suction cup assembly to engage the second container.

16. The method of claim 15, further comprising:

causing the first suction cup to push the second container off of a conveyance surface of the item manipulation device.

17. The method of claim 14, further comprising:

causing the item manipulation device to be moved into position adjacent to the first container using a robotic manipulator.

* * * * *